Dec. 1, 1970     F. HAUPT     3,544,244
GEAR PUMP
Filed Sept. 9, 1968
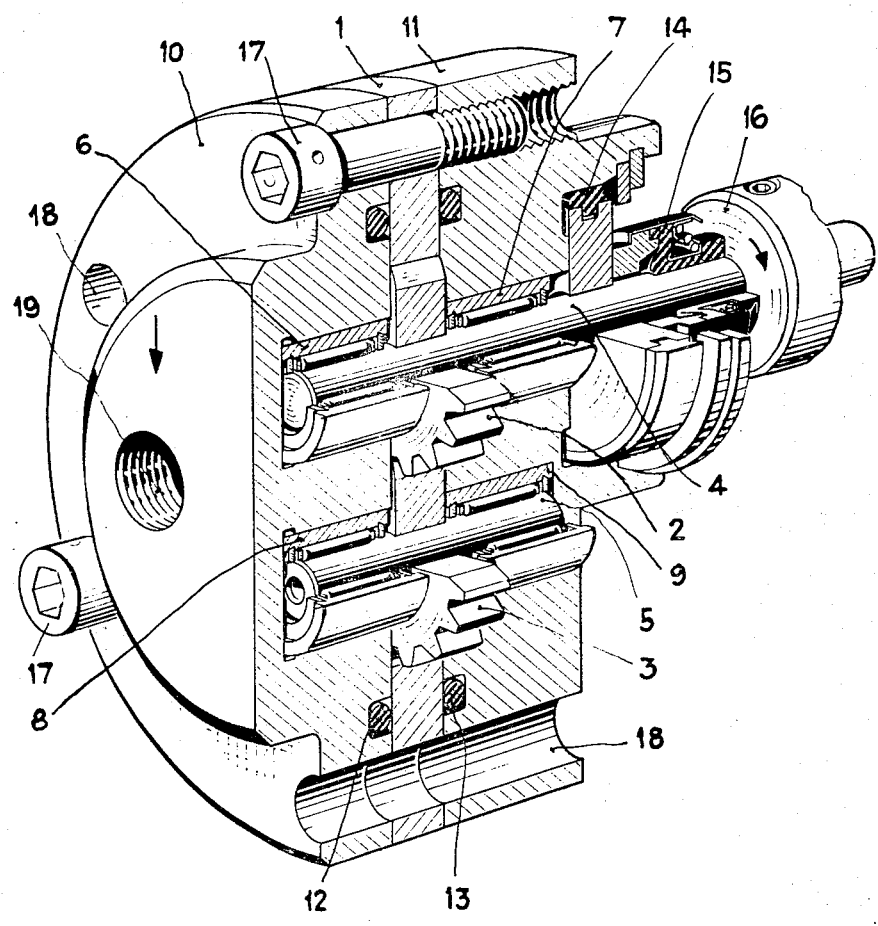
INVENTOR:
FRITZ HAUPT

United States Patent Office 3,544,244
Patented Dec. 1, 1970

3,544,244
GEAR PUMP
Fritz Haupt, Zurich, Switzerland, assignor to Maag Gear Wheel & Machine Company Limited, Zurich, Switzerland
Filed Sept. 9, 1968, Ser. No. 758,495
Int. Cl. F04c *1/00;* F04d *29/40;* F04b *21/08*
U.S. Cl. 418—178                              4 Claims

ABSTRACT OF THE DISCLOSURE

A gear pump, particularly for pumping gasoline under high pressures, comprises two intermeshed gears on substantially parallel shafts and an annular casing of substantially the same thickness as the gears surrounding the periphery of the gears and held between two casing covers arranged on respective sides of the gears which carry bores for receiving and rotatably supporting the shafts. The casing is made of a metal material with running-in properties and at least the sides of the casing covers which come in contact with the gear wheels have a hard surface. These surfaces are advantageously made by anodizing a light metal alloy such as Anticorodal, for example, and the gears are nitrided at least on the teeth and the lateral surfaces so that they can runin in the casing to operate with a very small running clearance.

SUMMARY OF THE INVENTION

This invention relates, in general, to a construction of pumps and, in particular, to a new and useful gear pump particularly for pumping gasoline under high pressure conditions and having two externally toothed gear wheels mounted on two parallel shafts which are surrounded by a casing of substantially the same thickness as the gear wheels and which is held between two casing covers secured on both sides of the gear wheels.

The present gear pumps for gasoline delivery do not permit very high pressures and are susceptible to operating troubles so that they do not prvide a long service life with high reliability. Particularly with pumps that are used for the delivery of gasoline, for example, in connection with the injection of gasoline into automotive engines without carburetors, a very high reliability and thus a long service of the pump are important.

In accordance with the invention, there is provided a pump of a construction which permits long and reliable operation without deterioration of the parts or rapid changing of the operating tolerances. To this end, the pump includes a pair of interengaged gear pump elements, which are surrounded by an annular casing of substantially the same thickness as the gears. The shafts are rotatably supported in casing covers which are positioned on respective sides of the gears. The covers have a hard surface at least in the areas which contact the respective sides of the gears. The covers are sealed to the casing by annular sealing rings arranged in grooves of the cover side faces. The construction permits the manufacture of the gear housing and the gears in a simple manner while retaining high tolerance precision and permits excellent operational performance with the maintenance of exact tolerances. The casing is advantageously of a non-hardened material with good running-in properties. The casing covers which come in contact with the gear wheels have a hard surface and the gear wheels are provided with a similar hard surface.

Accordingly, it is an object of the invention to provide a gear pump having a pair of interengaged pump gear elements which are mounted on spaced parallel shafts which are supported in casing covers on each side of the shaft and which abut against the sides of the gear wheels and an annular casing surrounding the gears of substantially the same thickness as the gears, the casing being sealed between the covers and being manufactured to provide a close running peripheral tolerance to the operating gears.

A further object of the invention is to provide a pump of good capacity and durability which is simple in design, rugged in construction and economical to manufacture.

For an understanding of the principles of the invention, reference is made to the following description of a typical embodiment thereof as illustrated in the accompanying drawing.

BRIEF DESCRIPTION OF THE DRAWING

The only figure of the drawing, FIG. 1, is a perspective view partly in section of a gear pump constructed in accordance with the invention.

DETAILED DESCRIPTION OF THE PREFERRED EMBODIMENT

Referring to the drawing, in particular, the invention embodied therein comprises a gear pump including an annular casing, generally designated 1, which surrounds two operable interengaged gear elements or gears 2 and 3. The gears 2 and 3 are secured on spaced parallel shafts 4 and 5, respectively, advantageously by means of a suitable metal cement or by shrinking-on. The use of cement is generally preferable because it permits a more accurate aligning of the gears.

In accordance with the invention, the gear wheels 2 and 3 are made of a nitriding steel and are nitrided at least on the surfaces, particularly on the teeth and the lateral surfaces. The shafts 4 and 5 are supported by means of needle bearings 6 and 7 and 8 and 9, respectively. The needle bearings 6, 7, 8 and 9 are supported in respective casing covers 10 and 11. The casing covers 10 and 11 are secured on each side of the casing 1 and abut against the respective sides of the casing 1 and the gear side surfaces. The gear pumping space is sealed by annular rings or gaskets 12 and 13, which are positioned in grooves defined in the respective covers 10 and 11. The gaskets 12 and 13, together with axial gaskets 14 and 15, provide a liquid seal for the pumping space. The shaft 4 is driven through a drive which includes a coupling 16. The whole assembly is secured together by screws or bolts 17 which extend through axial bores 18 and are tightened in an internally threaded bore end to pull the two casing covers 10 and 11 tightly against the respective faces of the casing 1 and up to the gears 2 and 3.

Liquid is drawn in through a suction opening 19 and discharged at the opposite side through a discharge opening (not shown) which connects to the gear chamber on a side opposite to the connection of the inlet 19. When the drive shaft is turned in the direction of the arrow indicated on the coupling 16, the gasoline is drawn into the suction tube 19 and pumped out through the outlet which is not shown.

A feature of the invention is that the casing 1 is made of a light metal alloy such as Anticorodal, for example. The nitrided gear wheels 2 and 3 thus can run-in in the casing 1 so that a very small running clearance is possible. The gears 2 and 3 are advantageously nitrided on at least the teeth and the lateral surfaces. The two casing covers 10 and 11 are also made of a lightweight metal alloy and at least the teeth and the lateral surfaces that come in contact with the gear wheels 2 and 3 are anodically oxidized and have thus an extremely hard surface. Wear between the covers 10 and 11 and the gear wheels 2 and 3 is practically impossible. Therefore, not only great reliability but also long service life of the pump is insured. In tests, no traces of wear could be found after 1000 operating hours and a pressure of 20 kilograms per square centimeter (284 pounds per square inch absolute).

The fastening of the gear wheels 2 and 3 on the shafts 4 and 5 by means of cement provides smooth shafts which are not weakened by any interruptions so that the danger of fracture due to stress concentration is practically excluded.

What is claimed is:

1. A gear pump for pumping gasoline at high pressures comprising first and second parallel shafts, first and second nitrided hardened steel gear wheels mounted respectively on said first and second parallel shafts being of substantially the same thickness and being interengaged for pumping operation, a casing made of a light metal alloy material and of approximately the same thickness as the gear wheels and in rubbing contact with the peripheries thereof surrounding said gear wheels, a casing cover secured on each side of said casing and bearing against said casing and rotatably supporting said parallel shafts, said casing being made of a metal material with running-in properties and at least the lateral surfaces of said casing covers which are in rubbering contact with said gear wheels has a hard surface made of anodically oxidized metal material.

2. A gear pump according to claim 1, wherein said gear wheels are secured on the shaft by means of cement.

3. A gear pump according to claim 1, wherein each of said casing covers has an annular groove on the surface side thereof which is adjacent said casing, and an annular sealing gasket disposed in the groove of each of said casing covers and sealingly compressed against said casing.

4. A gear pump according to claim 2, including a plurality of axially extending bolts engaged through said casing covers and said casing and tensioned for holding said casing covers and said casing tightly together.

References Cited

UNITED STATES PATENTS

| | | | |
|---|---|---|---|
| 1,785,386 | 12/1930 | McIntyre | 103—126 (M) UXR |
| 2,395,824 | 3/1946 | Herman | 103—126 |
| 2,611,323 | 9/1952 | Digney | 103—216 (M) UXR |
| 2,742,224 | 4/1956 | Burhans | 230—133 (M) UXR |
| 3,044,687 | 7/1962 | Davey | 103—216 (M) UXR |
| 3,144,362 | 8/1964 | Bradd | 103—216 (M) UXR |
| 3,155,313 | 11/1964 | Bentele | 103—216 (M) UXR |
| 3,242,692 | 3/1966 | Sweet | 64—4 |

ROBERT M. WALKER, Primary Examiner

W. P. KRAUSS, Assistant Examiner

U.S. Cl. X.R.

103—216; 230—133; 418—179, 206